United States Patent
Gay Sam et al.

(10) Patent No.: US 6,671,790 B2
(45) Date of Patent: Dec. 30, 2003

(54) OPTIMIZING READER TO WRITER OFFSET COMPENSATION FOR A DISC DRIVE

(75) Inventors: Alfredo Gay Sam, Oklahoma City, OK (US); John Edward Young, Norman, OK (US)

(73) Assignee: Seagate Technology LLC, Scotts Valley, CA (US)

(*) Notice: Subject to any disclaimer, the term of this patent is extended or adjusted under 35 U.S.C. 154(b) by 167 days.

(21) Appl. No.: 09/971,348

(22) Filed: Oct. 4, 2001

(65) Prior Publication Data

US 2002/0184466 A1 Dec. 5, 2002

Related U.S. Application Data

(60) Provisional application No. 60/295,780, filed on Jun. 4, 2001.

(51) Int. Cl.[7] .............................................. G06F 12/00
(52) U.S. Cl. ........................... 711/202; 360/75; 360/76; 360/77.02
(58) Field of Search ............................ 711/202; 360/75, 360/76, 31, 77.02

(56) References Cited

U.S. PATENT DOCUMENTS

| | | |
|---|---|---|
| 5,587,850 A | 12/1996 | Ton-that |
| 5,615,061 A | 3/1997 | Singh |
| 5,825,578 A | 10/1998 | Shrinkle et al. |
| 5,978,168 A | 11/1999 | Mathews et al. |
| 6,078,461 A | 6/2000 | Smith et al. |
| 6,091,560 A | 7/2000 | Du |
| 6,118,615 A | 9/2000 | Takaishi |
| 6,122,133 A | 9/2000 | Nazarian et al. |
| 6,154,335 A | 11/2000 | Smith et al. |
| 6,198,584 B1 | 3/2001 | Codilian et al. |
| 6,243,223 B1 | 6/2001 | Elliott et al. |
| 6,356,402 B2 | 3/2002 | Igarashi et al. |
| 6,476,992 B1 * | 11/2002 | Shimatani ..................... 360/46 |
| 6,490,121 B1 * | 12/2002 | Pruett et al. ............. 360/78.09 |
| 6,510,017 B1 * | 1/2003 | Abdelnour ............... 360/77.04 |
| 6,560,055 B1 * | 5/2003 | Nemazie et al. .............. 360/53 |
| 2001/0006436 A1 | 7/2001 | Akiyama et al. |

* cited by examiner

*Primary Examiner*—Donald Sparks
*Assistant Examiner*—Kathy Takeguchi
(74) *Attorney, Agent, or Firm*—Fellers, Snider, et al.

(57) ABSTRACT

A method for optimizing logical track to physical track offset compensation of a data storage device includes steps of: associating each of a plurality of logical tracks to one of a plurality of physical tracks, selecting a set of sample tracks from the plurality of physical tracks, measuring an offset value for each logical track associated with one of the sample tracks, deriving, through an extrapolation technique, an offset compensation value for use with each of the sample tracks absent an association with one of the logical tracks, linking each measured offset compensation value and each estimated offset compensation value with its associated physical track, calculating, through an interpolation technique, an offset compensation value for use with each of the physical tracks absent an association with one of the sample tracks.

20 Claims, 5 Drawing Sheets

OPTIMIZING READER TO WRITER OFFSET COMPENSATION FOR A DISC DRIVE

RELATED APPLICATIONS

This application claims priority to U.S. Provisional Application No. 60/295,780 filed Jun. 04, 2001, entitled Algorithm to Improve the Reader-to-Writer Offset Optimization for High TPI Recording.

FIELD OF THE INVENTION

This invention relates generally to the field of magnetic data storage devices, and more particularly, but not by way of limitation, to a method of optimizing reader to writer offset compensation for a disc drive.

BACKGROUND

Disc drives are used for data storage in modem electronic products ranging from digital cameras to computer systems and networks. A typical disc drive includes a head-disc assembly (HDA), housing the mechanical portion of the drive, and a printed circuit board assembly (PCB) attached to the HDA, for controlling operations of the HDA and providing a communication link between the disc drive and its host.

Typically, an HDA comprises a recording surface affixed to a spindle motor assembly for rotation at a constant speed and an actuator assembly positionably controlled by a closed loop servo system. The actuator assembly supports a read/write head that traverse a plurality of radially spaced, generally concentric magnetic tracks on the recording surface. Disc drives using magneto resistive read/write heads typically use an inductive element, or writer, of the read/write head to write data to the magnetic tracks and a magneto resistive element, or reader, to read data from the magnetic tracks during drive operations. One type of data recorded to and read from the magnetic tracks is servo data. Servo data, including a physical track identification portion (also referred to as a servo track number or physical track number), written to the recording surface define each specific physical track of a number of physical tracks written on the recording surface. A servo track writer typically writes a predetermined number of physical tracks, also referred to as servo tracks, to each recording surface during the manufacturing process. The physical tracks are used by the closed loop servo system for controlling the position of the read/write head relative to the recording surface during disc drive operations.

High performance disc drives of the present generation typically achieve aerial bit densities measured in several gigabits per square centimeter, $Gbits/cm^2$. Higher recording densities can be achieved by increasing the number of bits stored along each magnetic track or bits per inch (BPI), and/or by increasing the number of magnetic tracks provided per unit width or tracks per inch (TPI) across each recording surface. Increased BPI generally requires improvements in the read/write channel electronics to enable the data to be written (and subsequently read) at a correspondingly higher frequency.

Higher TPI generally requires improvements in servo control systems to enable the read/write heads to be more precisely positioned relative to the magnetic tracks. With increasing TPIs, separation between the reader and the writer of a fixed geometry MR read/write head, expressed as a number of magnetic tracks separating the two, increases at the same rate as the growth in TPI. As widths of the magnetic track decrease, the need to more precisely position the reader of the read/write head at track center of the magnetic track being read escalates. The heightened need to more precisely position the reader arises because the amplitude of the read signal drops off more sharply with each increment of lateral separation between the read element tracking at track center and data written off track center. The term track center is defined as the center of the servo data recorded on the magnetic track being read.

Because the reader is both laterally and longitudinally offset from the writer, and because the read/write head scribes an arch across the plurality of generally concentric magnetic tracks of the recording surface, the relative position of the reader in relation to track center of the magnetic tracks changes with the physical location of the read/write head relative to the recording surface. Near an outer diameter of the recording surface, the offset of the writer relative to track center of a magnetic track near the outer diameter of the recording surface and selected for writing data to, is at a first maximum. While near the inner diameter of the recording surface, the offset of the writer relative to track center of a magnetic track selected for writing data to, is at a second maximum. Near the center of the recording surface, the offset of the writer relative to track center of a magnetic track selected for writing data to, is substantially zero. The direction of offset of the second maximum offset from its track center is opposite from the direction of offset of the first maximum offset from its track center. Depending on the direction of offset, the compensation applied to the position signal during track following will be added as either a positive offset or a negative offset.

Typically, a plurality of logical tracks, each including a logical track identification portion (also referred to as a data track number or logical track number) is assigned and recorded onto the recording surface during a drive testing portion of the manufacturing process. Each logical track is associated with one of the physical tracks. During the servo write process, the physical location of each of the plurality of physical tracks, i.e., track spacing for the magnetic tracks and the physical track identification portions are defined and assigned to each magnetic track of the recording surface. Generally, a data track number does not correspond in value to a servo track number assigned the magnetic track. For example, data track "0" may be assigned, positioned and logical block addresses written to a magnetic track that coincides with servo track "1450" written to the recording surface during the servo write process.

Once each logical track has been assigned to one of the plurality of physical tracks, either a look-up table linking the relationship between a value of the logical track identification portion and a value of its associated physical track identification portion is provided, or a value to be used in translating between the value of the logical track identification portion and the value of its associated physical track identification portion is provided. During disc drive operations either the look-up table, the value or a conversion algorithm is used by a controller of the disc drive to convert from a requested logical track number to a corresponding servo track number, which the servo system uses to position the read/write head relative to the requested logical track.

During the process of assigning logical track numbers to each magnetic track, a calibration process is executed on selected logical tracks to determine an amount of compensation to be added by the servo system to position the writer to track center of the servo track associated with the selected logical track. Aligning maximum amplitude of the data being written to the selected logical track with track center of the servo track associated with selected logical track facilitates maximum recovery of the data during readback operation of the disc drive. The value of the compensation, measured in steps of the actuator, varies across the recording surface as a function of the diameter of the recording surface and an angle of presentation of the reader to the recording surface, which changes from the OD to the ID, across the recording surface.

The calibration process entails servoing on a physical track associated with a selected logical track; writing data to the selected logical track; stepping the reader over a half track to one side of the physical track and recording an amplitude of the data written to the logical track at that position; stepping the reader over a half track to the other side of the physical track and recording an amplitude of the data written logical track at that position; then collecting and analyzing amplitude measurements between those two positions to determine a maximum amplitude for the data written to the logical track; and then recording the number of steps and direction from track center needed to compensate the offset into a compensation table, also referred to as a MR jog table, for use by the servo system the disc drive executes write operations on the selected logical track. However, in the prior art, the MR jog table is set up based on physical track numbers, while the compensation values written to the table are based on logical track numbers. This disparity in track number identification leads to incorrect compensation values being accessed by the servo system.

For example, assume logical track "10" is selected for calibration, and logical track "10" corresponds to physical track "160". Upon completing the calibration process for logical track "10", the compensation value based on the measured offset of logical track "10" is linked in the MR jog table to physical track "10". So the compensation value selected from the MR jog table associated with physical track "10" is the compensation value applicable to physical track "160". For the present example, when a request is received by the servo controller to access logical track "10", the servo controller converts the logical track "10" to physical track "160". Next, the MR jog table is accessed for the offset value logged for physical track "160", while the compensation value applicable for use with logical track "10" is linked to physical track "10" within the MR jog table. In this example, the compensation value read from the MR jog table associated with physical track "160" are applicable for use with logical track "160". But when a request is received to position the writer in alignment with logical track "160", the servo controller converts the requested logical track "160" to physical track "310". Then the compensation value linked to physical track "310" is selected for application, which of course is an incorrect compensation value for logical track "160". In a prior art disc drive, this mismatch in the application of compensation values posed few difficulties, because the resulting error fell below the ability of measuring the error.

The total number of tracks selected for use in determining compensation values is typically in the order of 50 to 100. The logical tracks selected for measurement are generally physically evenly distributed, from the OD to the ID, across the recording surface. The physical position, as opposed to the logical position, of the read/write head relative to the recording surface, has a direct bearing on the final amount of compensation needed.

Again, in prior art, as long as the difference between, for example, logical track 500 and servo track 500 was relatively small (50 to 200 tracks), the error created by selecting a compensation value based on the servo track number to compensate the position of the writer of the read/write head relative to the logical track number was minor. However, as TPI increases and the difference between a logical track number and its associated servo track number increases, the effects from the application of incorrect offset compensation values greatly affects the data recovery performance of high performance disc drives of the present generation.

High performance disc drives of the present generation typically have a difference between a logical track number and its associated servo track number of greater than 1,000 tracks.

The error created by applying incorrect compensation values is substantially a magnitude difference in raw bit error rate, when the difference between the servo track number and the logical track number is in the range of greater than 1,000 tracks. An increasing raw bit error rate leads directly to data throughput degradation thereby hindering the overall performance of the disc drive.

Therefore, challenges remain and a need persists for methods of optimizing reader to writer offset compensation for a disc drive using MR read/write heads. It is to this and other features and advantages set forth herein that embodiments of the present invention are directed.

SUMMARY OF THE INVENTION

The present invention provides a method for optimizing reader to writer offset compensation values for use by a disc drive. In accordance with one embodiment, the method includes steps of associating each logical track of a plurality of logical tracks to a physical track of a plurality of physical tracks, selecting a set of sample tracks from the plurality of physical tracks for use in determining offset compensation values.

Next, the method includes a step of determining an offset compensation value for each sample track of the set of sample tracks associated with one of the logical tracks is accomplished by measuring an offset value for each logical track associated with one of the sample tracks and deriving an offset compensation value for each of the sample tracks absent an association with one of the logical tracks.

Then, each measured offset compensation value and each estimated offset compensation value is linked with its associated physical track, followed by a step of calculating an offset compensation value for use with each of the physical tracks absent an association with one of the sample tracks. Collectively the measured, estimated and calculated compensation values provide optimized compensation values for use by the disc drive in aligning a writer of a read/write head to a track center of a selected physical track in preparation for writing data to a logical track associated with the selected physical track.

These and various other features and advantages which characterize the present invention will be apparent from a reading of the following detailed description and a review of the associated drawings.

DETAILED DESCRIPTION

Figure 1:
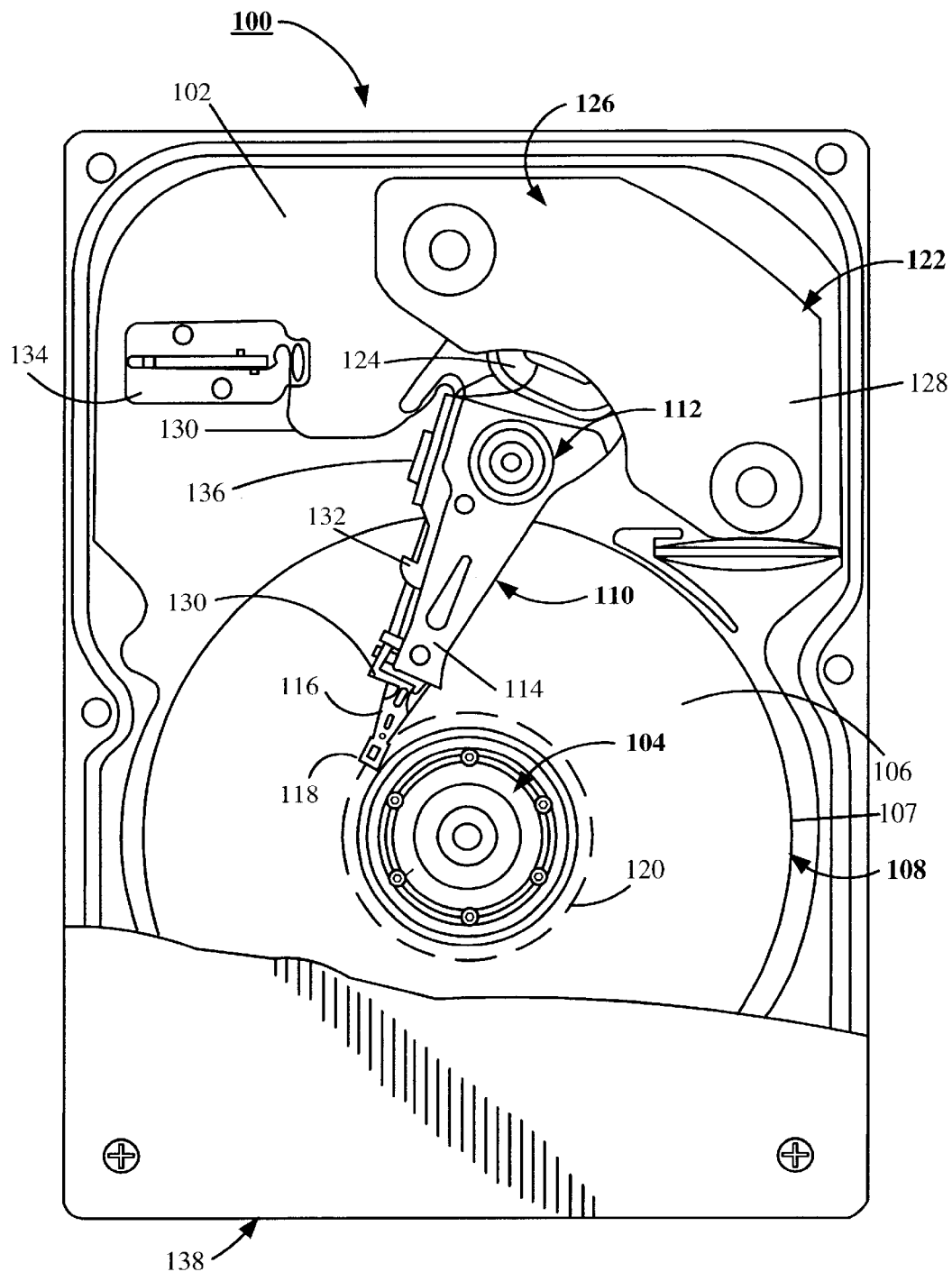
FIG. 1 is a top plan view of a disc drive incorporating reader to writer offset compensation for a disc drive in accordance with a method of the present invention.

Referring to the drawings in general, and more particularly to FIG. 1, shown therein is a top view of a disc drive 100, also referred to herein as a data storage device 100, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various disc drive components, including a spindle motor assembly 104 supporting an axially aligned rotatable recording surface 106 and forming a disc stack 108. For purposes of disclosure, the rotatable recording surface 106 is also referred to herein as a recording surface 106.

Adjacent the disc stack 108 is an actuator assembly 110 (also referred as a head stack assembly (HSA)), which pivots about a bearing assembly 112 in a rotary fashion. The head stack assembly 110 includes an actuator arm 114 that supports a load arm 116, which in turn supports at a read/write head 118 (also referred as head(s) 118) corresponding to the rotatable recording surface 106. The rotatable recording surface 106 is divided into concentric data tracks 120 (only one shown) over which the read/write head 118 is positionably located. The rotatable recording surface 106 supports head position control information written to embedded servo sectors (not separately shown). Between the embedded servo sectors are data sectors (not separately shown) used for storing data. The read/write head 118 includes a reader element (not separately shown) offset radially and laterally from a writer element (not separately shown). The writer element writes data to the concentric data tracks 120 during write operations of the disc drive 100, while the reader element controls the positioning of the read/write head 118 relative to the concentric data tracks 120 during disc drive operations.

The term "servoing", also referred to as position-controlling, as used herein means maintaining control of the read/write head 118 relative to the rotating recording surfaces 106 during operation of the disc drive 100. When servoing to or on the data track 120, the head stack assembly 110 is controllably positioned by a primary actuator motor 122 (also referred to herein as a voice coil motor assembly, VCM). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122 causing the actuator coil 124 to move relative to the magnet assembly 126. As the actuator coil 124 moves, the head stack assembly 110 pivots about the bearing assembly 112, causing the head 118 to move over the rotatable recording surface 106, thereby allowing the head 118 to interact with the data tracks 120 of the recording surfaces 106.

To provide the requisite electrical conduction paths between the read/write head 118 and disc drive read/write circuitry (not shown), read/write head wires (not shown) of the read/write are affixed to a read/write flex circuit 130. Next, the read/write flex circuit 130 is routed from the load arms 116 along the actuator arms 114 and into a flex circuit containment channel 132. The read/write flex is then secured to a flex connector body 134. The flex connector body 134 supports the flex circuit 130 during passage of the read/write flex circuit 130 through the basedeck 102 and into electrical communication a disc drive printed circuit board assembly (PCBA) (not shown) mounted to the underside of the basedeck 102. The flex circuit containment channel 132 also supports read/write signal circuitry including preamplifier/driver (preamp) 136 used to condition read/write signals passed between the read/write circuitry (not shown) and the read/write head 118. The disc drive PCBA provides the disc drive read/write circuitry, which controls the operation of the head 118, as well as other interface and control circuitry for the disc drive 100.

The disc drive 100 has two primary assemblies, the PCBA (not shown) and a head disc assembly (HDA) 138 attached to the PCBA. Typically, included within the head disc assembly 138 are the head stack assembly 110, the voice coil motor 122 and the disc stack 108.

Figure 2:
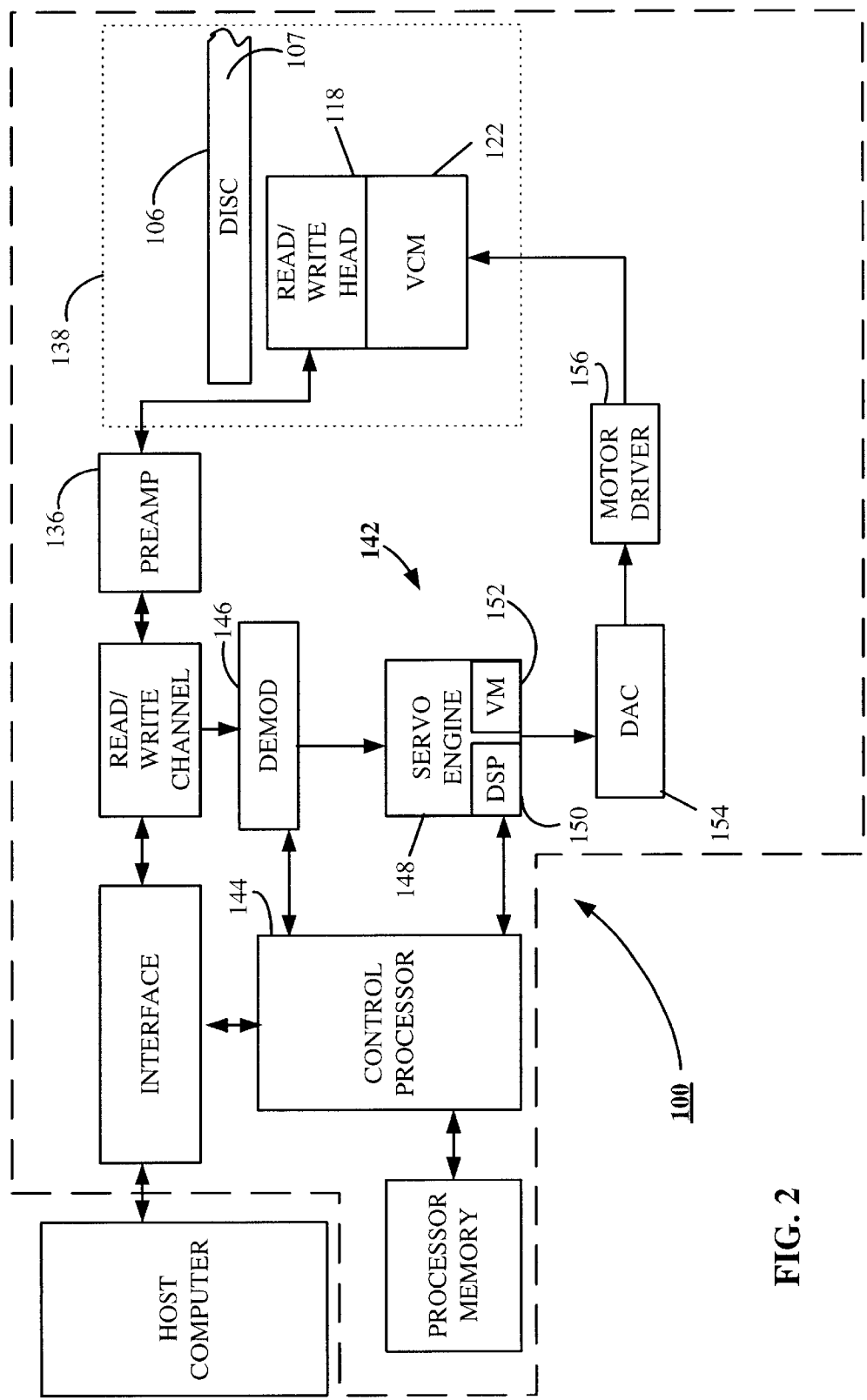
FIG. 2 is a functional block diagram of control circuitry of the disc drive of FIG. 1.

Turning to FIG. 2, position-controlling of the heads 118 is provided by the positioning mechanism (not separately shown) operating under the control of servo control circuit 142 programmed with servo control code, which forms the servo control loop. The servo control circuit 142 includes control processor 144, a demodulator (demod) 146, may include an application specific integrated circuit (ASIC) hardware-based servo controller ("servo engine") 148, may include a digital signal processor 150, and includes volatile memory (VM) 152, a digital to analog converter (DAC) 154 and a motor driver circuit 156. Optionally, the functions of servo engine 148, DSP 150 and volatile memory 152 may all be contained within control processor 144. The components of the control circuit 142 are utilized to facilitate track following algorithms for the head stack assembly 110 (of FIG. 1) and more specifically for controlling the voice coil motor 122 in position-controlling the heads 118 relative to the selected data track 120 (of FIG. 1).

The demodulator 146 conditions head position control information transduced from the rotatable recording surface 106 to provide position information of the heads 118 relative to the data track 120 (of FIG. 1). The servo engine 148 generates servo control loop values used by control processor 144 in generating command signals such as seek signals used by voice coil motor 122 in executing seek commands, and to maintain a predetermined position of the head stack assembly 110 (of FIG. 1) during data transfer operations. The command signals generated by the control processor 144 are converted by the DAC 154 to analog control signals for use by the motor driver circuit 156 in position-controlling the heads 118 relative to the selected data track 120, for track following, and relative to the recording surface 106 for track to track seek functions.

In disc drive 100, the command signals generated by the control processor 144 include reader to writer offset compensation values. The reader to writer offset compensation values are included in the command signals to properly align the reader element of the read/write head 118 to the data track 120 when reading data previously written by the write element of the read/write head 118 to the data track 120.

Figure 3:
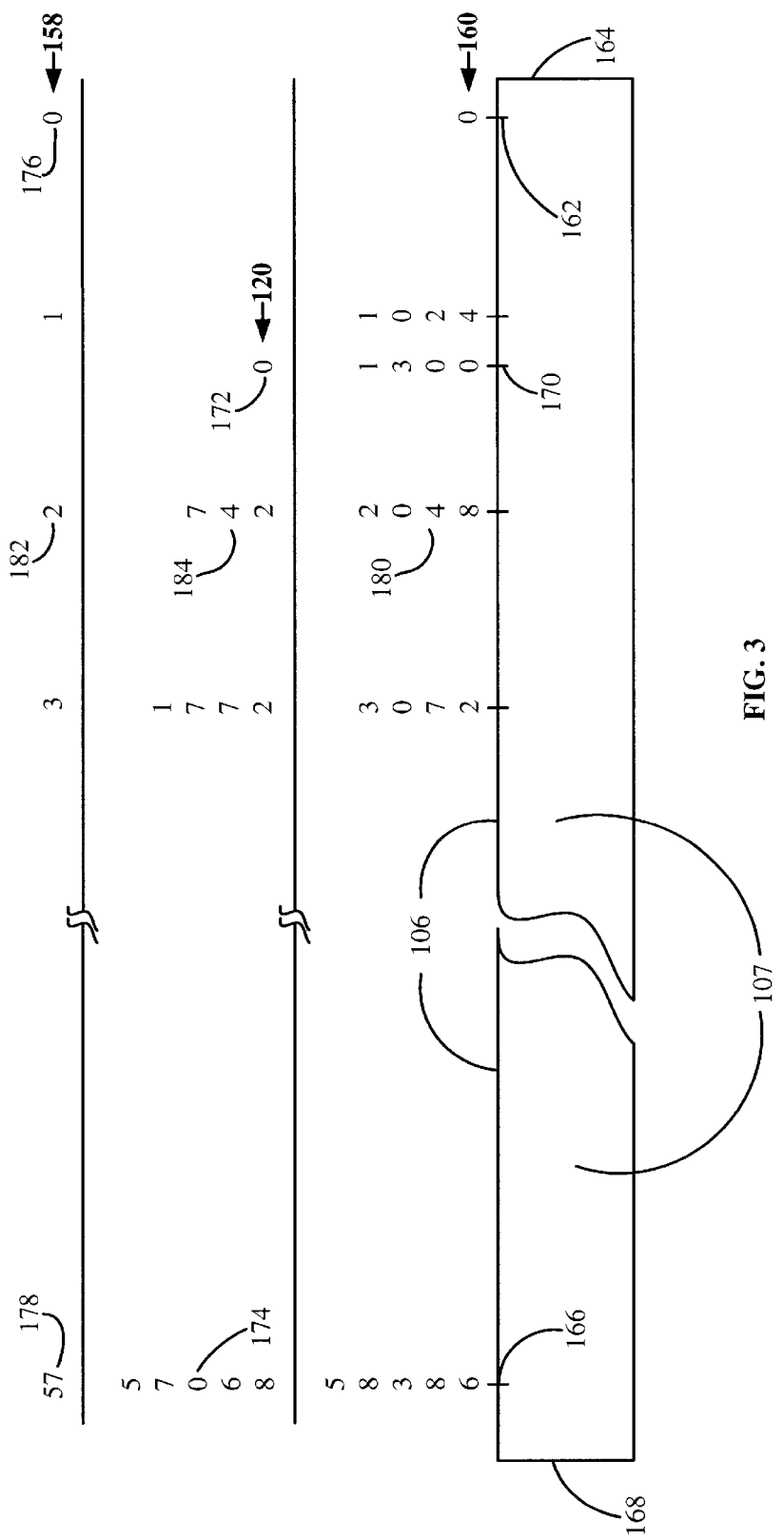
FIG. 3 shows a partial elevational view of a recording surface and an expanded view of a relationship between a plurality of physical track, a plurality of logical tracks and a plurality of sample tracks of the disc drive of FIG. 1.

FIG. 3 shows a set of sample tracks 158 in relation to the recording surface 106, a plurality of data tracks 120, also referred to as logical tracks 120, in relation to the recording surface 106 and a plurality of servo tracks 160, also referred to as physical tracks 160, in relation to the recording surface 106. Each physical track 160 comprises a predetermined plurality of head position control information blocks (not shown separately) consecutively written and distributed substantially uniformly on the recording surface 106. Each head position control information block of a given physical track 160 is written to the recording surface 106 at a substantially equal distance from the axis of rotation of the spindle motor assembly 104 (of FIG. 1). This forms a substantially circumferential relationship between the plurality of head position control information blocks, of the given physical track 160, and the axis of rotation of the spindle motor assembly 104.

The physical tracks 160 are written to the recording surface 106 during the servo write process portion of the manufacturing process. While each logical track 120 of the plurality of logical tracks 120 is assigned an associated one of the physical tracks 160 during a manufacturing test process portion of the manufacturing process. In forming a logical track 120, a plurality of logical block addresses, each including a track identification number, (not separately shown) are written to the recording surface 106 between pairs of the plurality of head position control blocks of the physical track 160 associated with the logical track 120 being formed.

Locating and recording a first of the plurality of physical tracks 160 on the recording surface 106 is accomplished for each disc drive 100 (of FIG. 1) during the servo write process. At the onset of the servo write process, the head stack assembly 110 (of FIG. 1) is biased to a known physical location. The head stack assembly 110 is then repositioned at a predetermined distance from the known physical location to position the write element of the read/write head 118 (of FIG. 1) at a first physical track location 162 (typically denoted as track 0), of the plurality of physical tracks 160. Each of the plurality of head position control information blocks of the first physical track written to the recording surface 106 includes a physical track identification portion (not separately shown). The physical track identification portion is used to identify the particular physical track the read element of the read/write head 118 is aligned with, during operations of the disc drive 100.

Based on the physical and operating characteristics of the read element and the write element of the read/write head 118, in addition to capabilities of the servo control circuit 142 (of FIG. 2), a track density is determined for the disc drive 100 and the servo write process continues by writing the balance of the plurality of physical tracks 160 to the recording surface 106 of disc 107. Again, each of a plurality of head position control information blocks of a given physical track 160 is written to the recording surface 106 at a substantially equal distance from the axis of rotation of the spindle motor assembly 104 (of FIG. 1) and includes a physical track information portion.

For the embodiment shown by FIG. 3, the plurality of physical tracks 160 initiate at the first physical track location 162 (shown as physical track 0) adjacent an outer diameter 164 of disc 107. Each of a subsequent physical track 160 is written to the recording surface 106 in a substantially even distribution, one from another, across the disc surface 106. The final physical track 160 concludes at a final physical track location 166 (shown as physical track 58,386) adjacent an inner diameter 168 of the disc 107. Each of the plurality of logical tracks 120 are allocated to and assigned an association with one of the plurality of physical tracks 160. A first logical track 172 (shown as logical track 0) of the plurality of logical tracks 120 coincides with the physical track location 170 (shown as physical track 1300) of the plurality of physical tracks 160. The balance of the plurality of logical tracks 120 are substantially evenly distributed across the disc surface 106, with each of the plurality of logical tracks 120 coinciding with one of the plurality of physical tracks 160. A final logical track 174 (shown as 57,068) of the plurality of logical tracks 120 coincides with physical track location 166 (shown as physical track 58,386) of the plurality of physical tracks 160.

Under the track architectural scheme shown by FIG. 3, each of the plurality of logical tracks 120 correlates to and substantially coincides with a physical track of the plurality of physical tracks 160 in a way that the track identification of each of the plurality of physical tracks 160 is 1300 counts greater than the count of the track identification number of the logical track 120 associated the physical track 160. In other words, the first logical track 120 (shown as logical track 0) is located 1300 tracks in board from the first physical track 160 (shown as physical track 0). This results in 1300 tracks of the recording surface 106 available for use by the disc drive 100 during its operation that are inaccessible and unavailable for use in storing customer data.

The relationship between the track identification schema of the physical tracks 160 and the track identification schema of the logical tracks 120 shown by FIG. 3 is for disclosure clarification purposes only. Any number of track identification schemes may be employed and are encompassed by the scope of the present invention. Importantly, a short conversion factor or transfer function is stored in the form of an algorithm, a table or a value, denoting the relationship between each of the plurality of logical tracks 120 and each of the plurality physical tracks 160. This saves time, as compared with the use of conventional tables.

One of the factors taken into account in determining the track spacing across the recording surface 106, the separation between the reader and the writer of the read/write head 118. For proper functioning of the read/write head 118 that has the reader separate from the writer, a track center to track center relationship between the physical tracks 160 is established such that when the reader is aligned to a first physical track 160, the writer is aligned with a second physical track 160. However, when writing the physical tracks 160 to the recording surface 106 while maintaining coherence within each of the head position control information blocks, characteristics of the write element dictate the position of the read/write head 118 during the servo write process and the relationship between the reader and the writer of the read/write head 118 is secondary. As a result, a slight misalignment between the write element and track center of the data track 120, for the data track 120 the write element is addressing, occurs and needs compensation to maximize the efficiency of the data read back operations.

Keeping in mind that the reader of the read/write head 118 is both laterally and longitudinally offset from the writer the read/write head 118, and because the read/write head 118 scribes an arch across the plurality of generally concentric physical tracks 160 of the recording surface 106. With the reader at track center of a first physical track 160, the relative position of the writer in relation to track center of the second physical track 160 changes with the physical location of the read/write head 118 relative to the recording surface 106. To compensate for the changing misalignment, offset measurements are preferably used.

To facilitate the offset measurements, the sample tracks 158 are selected such that a first sample track 176 (designated as sample track 0) coincides with the first physical track 162 (designated as physical track 0), a final sample track 178 (designated as sample track 57) coincides with the final physical track 166 (designated as physical track 58,386) and the remaining sample tracks are distributed across the recording surface 106 with a substantially uniform amount of recording surface 106 physical space separating each of the sample tracks. Also, because of the association of each of the logical tracks 120 with a selected one of the physical tracks 160, an association between a number of the sample tracks 158 and an equal number of logical tracks 120 is established.

The relationship between the track identification schema of the physical tracks 160 and sample tracks shown by FIG. 3 is for disclosure clarification purposes only. Any number of track identification schemes for physical tracks 160 may be employed and are encompassed by the scope of the present invention. Only a conversion factor, whether in the form of an algorithm, a table or a value, denoting the relationship between each of the plurality of sample tracks 158 and each of the plurality physical tracks 160, that coincides with one of the plurality of sample tracks 158, is stored by the disc drive 100 and utilized by the present invention.

Preferably through empirical data, the relationship of the amount of reader to writer offset, across the recording surface 106, has been found to approximate a linear relationship. By selecting sample tracks 158 physically substantially evenly distributed across the recording surface 106 and measuring the offset present at each sample track 158 associated with one of the logical tracks 120, an actual reader to writer offset measurement can be made for each physical track 160 associated with one of the sample tracks 158 that is also associated with one of the logical tracks 120. Because of the approximately linear relationship of the reader to writer offset, a reader to writer offset for each physical track 160 associated with one of the sample tracks 158 but lacking an association with one of the logical tracks 120 can be extrapolated or derived. With an offset for each of the physical tracks 160 associated with one of the sample tracks 158 either measured or derived, an offset for each physical track 160 positioned between a pair of physical tracks 160, each associated with one of the sample tracks 158, but lacking an association with one of the sample tracks 158, can be calculated through interpolation.

Again, the offset occurs as a result of position-controlling the reader of the read/write head 118 in alignment with the track center of a first selected physical track 160, which results in misalignment of the writer of the read/write head 118 relative to a second physical track 160. Absent compensation, data written to the second physical track 160 would be misaligned with the track center of the second physical track 160, causing diminished data throughput efficiency and increased error rate during read operations of the disc drive 100. In making the offset measurements for the physical tracks 160 associated with the sample tracks 158, which are in turn associated with one of the logical tracks 120, the first physical track 160 to be measured is determined by the first sample track 158 that coincides with one of the logical tracks 120. The reason for the association of the first sample track 158 coinciding with one of the logical tracks 120 as a starting point for establishing compensation values is because the measurements made for compensation values are executed by test algorithms operating through the interface and incorporated in test software used in establishing the logical tracks 120.

For the case shown by FIG. 3, the first physical track 160 to be used for an offset measurement is physical track 180 (designated as physical track 2048). The reason physical track 180 is the first physical track to be used in determining an offset compensation value for use with its associated logical track 120, is because the first sample track 158 associated with a logical track 120 is sample track 182 (designated as sample track 2), which is associated with logical track 184 (designated as logical track 742).

In measuring the offset of the logical track 184 (designated as logical track 742) relative to track center of physical track 180, (designated as physical track 2048), the reader of the read/write head 118 is aligned to the track center of a first physical track 160 such that the writer of the read/write head 118 is positioned to write data to the logical track 184 (designated as logical track 742). With the reader of the read/write head 118 position-controlled at track center of the first physical track 160, data is written to the logical track 184 (designated as logical track 742). Next, the reader of read/write head 118 is repositioned to align the reader of the read/write head 118 relative to the track center of physical track 180 (designated as physical track 2048). The servo control circuit 142 programmed with servo control code (of FIG. 2) is capable of position-controlling the reader of read/write head 118 relative to track center of physical track 180, because the servo control circuit 142 is capable of directing movement of the read/write head by fractional portions of the width of the physical track 180. Each fractional portion is referred to as a step (not separately shown).

In making the measurement of the amount of offset between track center of physical track 180 and track center of logical track 184, the servo control circuit 142 directs a repositioning of the reader of the read/write head 118 a half of track width distance in a first direction from track center of physical track 180. The half of track width distance is accomplished through the servo control circuit 142 directing movement of the read/write head 118 a sufficient number of steps to constitute a half a track width. Once the reader of read/write head 118 is position-controlled a half of track from track center of physical track 180, an amplitude reading of the data written to the logical track 184 is made and stored. The reader is then repositioned a half of track distance from track center of physical track 180 in a second direction and a second amplitude reading of the data written to the logical track 184 is made and stored.

Next, the reader of the read/write head is sequentially repositioned by a predetermined number of steps to a number of position between the half of track distance from track center of physical track 180 in the first direction and the half of track distance from track center of the physical track 180 in the second direction. At each position an amplitude reading of the data written to logical track 184 is made and recorded, along with the direction and number of steps the position is from track center of physical track 180. Then, each of the plurality of amplitude measurements is analyzed to determine a maximum amplitude, or track center for the data written to logical track 184.

The number of steps and the direction from track center of physical track 180 that the track center for the data written to logical track 184 occurs is the offset of logical track 184 from physical track 180. The offset compensation value is the number of steps and direction from track center of physical track 180 that need to be applied by the servo control circuit 142 to position the writer of the read/write head 118 at track center of physical track 180. That number of steps needed for offset compensation is equal to the number of steps of offset, but the direction from track center of physical track 180 that the compensation steps are applied is opposite in direction from the direction the logical track 184 is offset from physical track 180. Applying an equal number of steps in a direction opposite to the offset compensates for the offset.

Each of the remaining physical tracks 160 associated with one of the remaining sample tracks 158 as well as one of the remaining logical tracks 120 is used for measuring the amount of offset of the logical track 120 associated with that particular physical track 160 by the technique described for physical track 180 to determine the appropriate compensation value for those remaining physical tracks 160. Compensation values for each of the remaining physical tracks 160 associated with one of the remaining sample tracks 158 and lacking an association with one of the remaining logical tracks 120 is derived from the compensation values determined through measurement.

To extrapolate the compensation values for each of the remaining physical tracks 160 associated with one of the remaining sample tracks 158 and lacking an association with one of the remaining logical tracks 120, the compensation values are plotted relative to the physical position of the sample tracks 158 to the recording surface 106. Once plotted, a function defined by the plot is empirically determined. With the function determined, the compensation values for the remaining physical tracks 160 associated with one of the remaining sample tracks 158 and lacking an association with one of the remaining logical tracks 120 are extrapolate through application of the function.

Returning to FIG. 2, in a preferred embodiment, a MR jog table is loaded into the volatile memory 152 portion of the servo engine 148. The table provides storage space for recording each physical track 160 (of FIG. 3) associated with one of the sample tracks 158 along with the compensation value associated with that particular track. When a request to write data to one of the logical tracks 120 is received by the control processor 144 the physical track 160 associated with the requested logical track is identified and a seek command is sent by the control processor 144 to the servo engine 148 to execute a seek for writing data to the logical track 120. As part of the seek process, the servo engine 148 reads the MR jog table stored in volatile memory 152. If the physical track 160 the writer of the read/write head 118 is being aligned with is one of the physical tracks loaded in the MR jog table, the compensation value associated with that physical track 160 is read from the MR jog table and used to position the writer of the read/write head 118 in alignment with track center of the physical track 160 the writer of the read/write head 118 is being aligned with.

If the physical track 160 the writer of the read/write head 118 is being aligned with is not one of the physical tracks loaded in the MR jog table, an appropriate compensation value is extrapolated from the compensation values stored in the MR jog table based on the physical position of that physical track 160 on the recording surface 106 (of FIG. 1) and the relationship of that physical track 160 relative to the two physical tracks 160 that are represented in the MR jog table and are the two physical tracks 160 closest to the physical track 160 the writer of the read/write head 118 is being aligned. Once extrapolated, the calculated compensation value is applied to the seek process to align the writer to track center.

Because the compensation values are based on logical track 120 measurements, in storing the compensation values in the MR jog table the conversion factor that associates the logical track 120 to its associated physical track 160 is applied to the logical track 120 to produce the identification of the physical track 160. With the physical track 160 identified, the compensation value associated with the logical track 120 and used to correct the offset of the logical track 120 relative to its associated physical track 160 is linked with the identified physical track 160 and stored for access via the MR Jog table.

Figure 4:
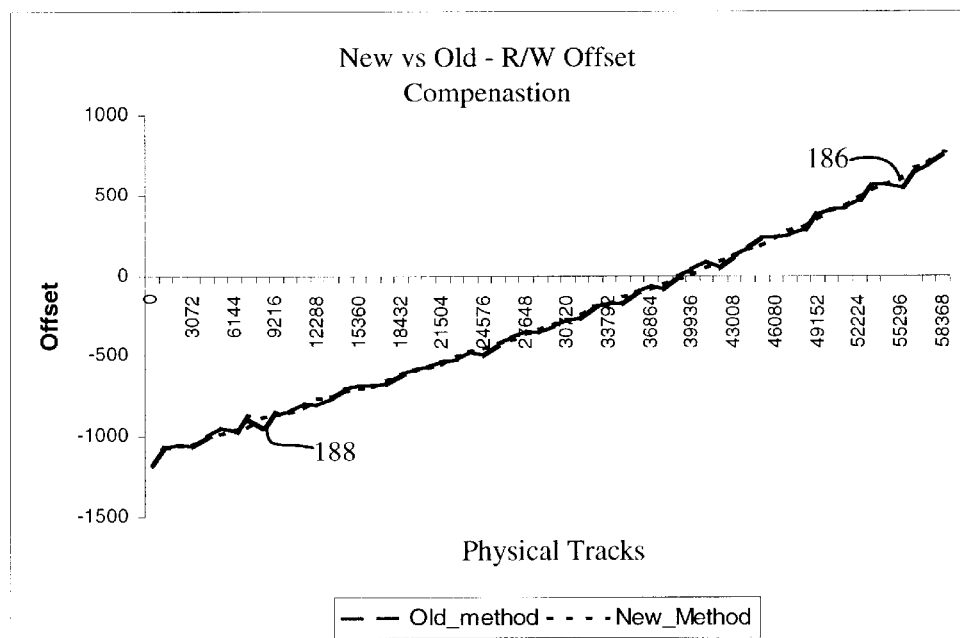
FIG. 4 is a graphical representation of offset comparison values provided by a prior art method vs. offset compensation values provided in accordance with the present invention for the disc drive of FIG. 1.

FIG. 4 shows a generally linear relation exists between the amount of reader to writer offset, across the recording surface 106 (of FIG. 1), that varies approximately linearly from physical track "0" to physical track "58368". It is noted that the linearity of the relationship between the offset compensation values provided by the method of the present invention, shown by relationship line 186, is greater than the linearity of the relationship between the offset compensation values provided by a prior art method, as shown by relationship line 188. Although the relationship lines 186 and 188 have a similar structure, the effect on the performance of disc drive 100 (of FIG. 1) is quite marked.

Figure 5:
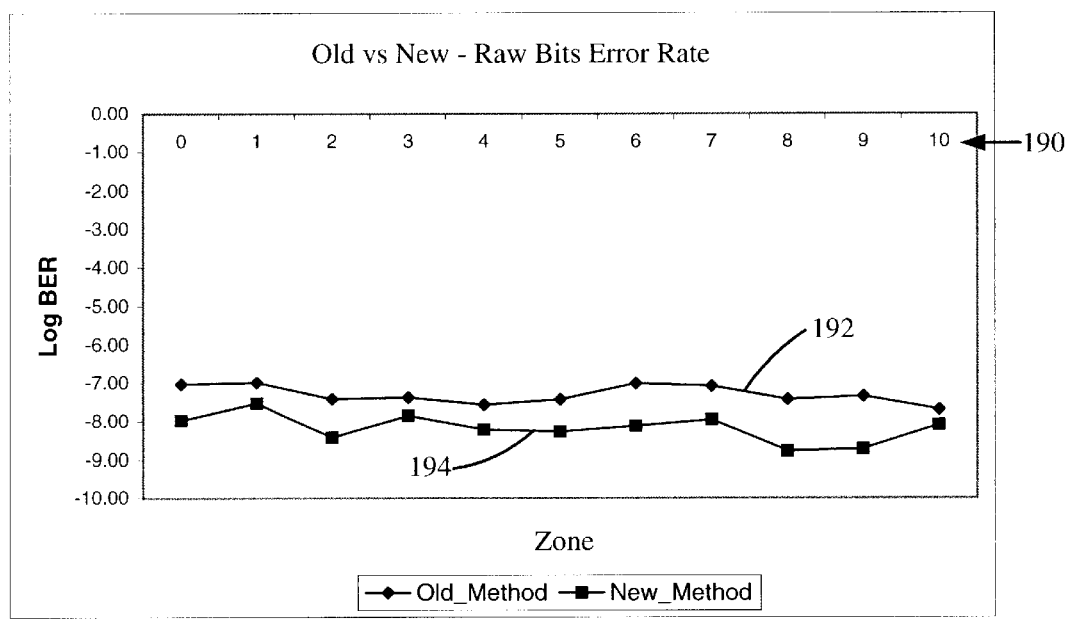
FIG. 5 is a graphical representation of an improvement in raw bits error rate resulting from application of the present invention vs. application of the prior art method for offset compensation values to the disc drive of FIG. 1.

FIG. 5 shows the raw bit rate to improve by a full order of magnitude. The raw bit error rate of the disc drive 100 (of FIG. 1) across zones 190 of the recording surface 106 (of FIG. 1) with the disc drive 100 operating with compensation values provided by the prior art method is shown by raw bit error rate line 192 to by substantially 1 error in every $10 \times 10^7$ bits passed or read from the logical tracks 120 (of FIG. 3) located within each zone 190. While the raw bit error rate of the disc drive 100 across zones 190 of the recording surface 106 with the disc drive 100 operating with compensation values provided by the present invention is shown by raw bit error rate line 194 to by substantially 1 error in every $10 \times 10^8$ bits passed or read from the logical tracks 120 (of FIG. 3) located within each zone 190.

Figure 6:
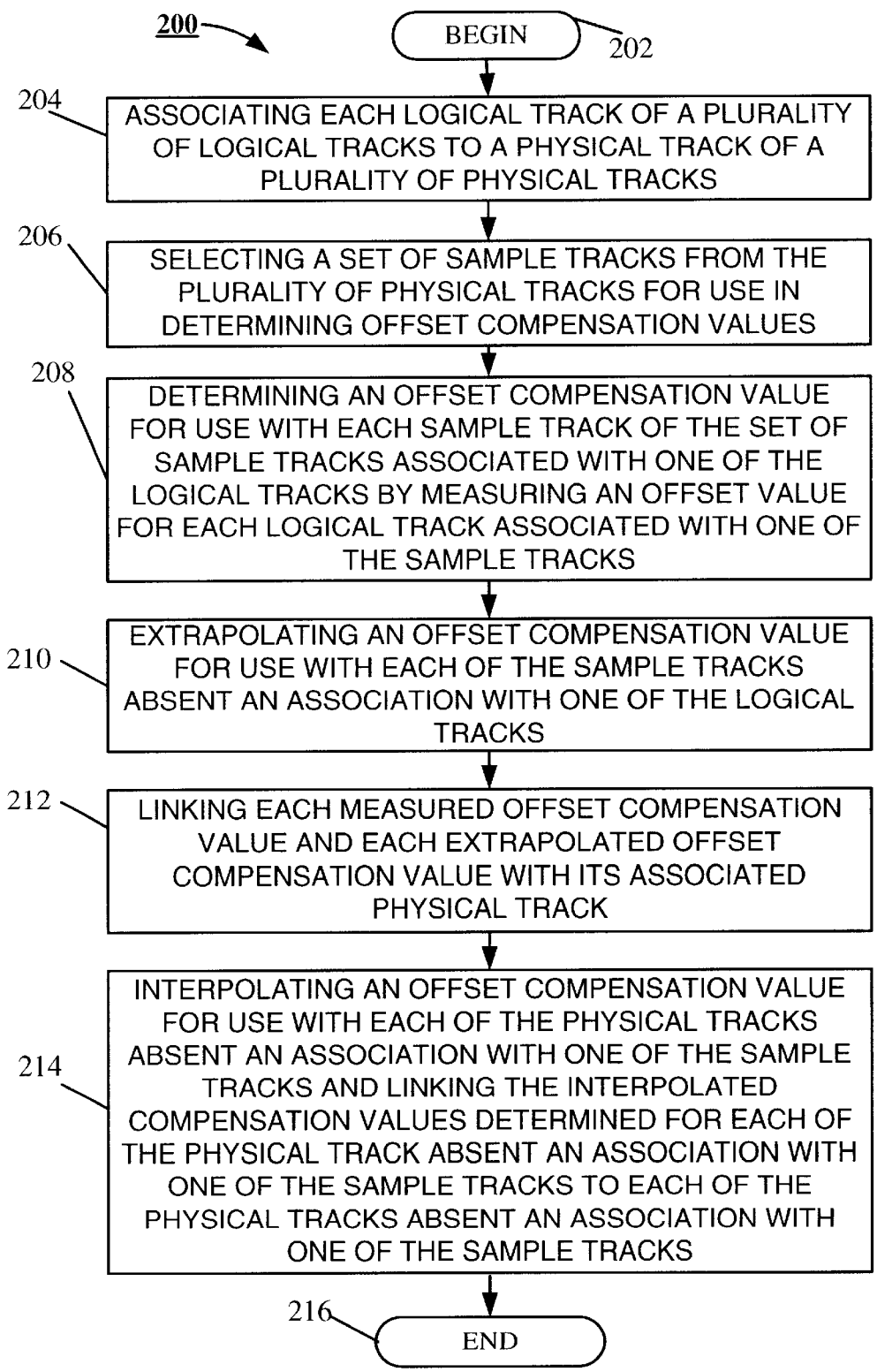
FIG. 6 is a flow chart of a method used to apply the present invention to the disc drive of FIG. 1.

FIG. 6 shows a logical track to physical track offset compensation optimization process 200 for a disc drive (such as 100) beginning at begin process step 202. The offset compensation optimization process 200 continues at process step 204 where each logical track (such as 184) of a plurality of logical tracks (such as 120) are associated to a physical track (such as 180) of a plurality of physical tracks (such as 160). The process continues at process step 206 or a set of sample tracks (such as 158) are selected from the plurality of physical tracks for use in determining offset compensation values.

With the selected set of the physical tracks identified as sample tracks, the offset compensation optimization process 200 continues with process step 208. In process step 208 in offset compensation value is determined for each sample track of the set of sample tracks associated with one of the logical tracks by measuring an offset value for each logical track associated with one of the sample tracks. In process step 210, for each sample track absent in association with one of the logical tracks, an offset compensation value is derived from the offset compensation values determined for each of the sample tracks associative with one of the logical tracks. The process continues at process step 212 where each compensation value, whether determined through measurements or by extrapolation, is linked to their associated physical tracks by storing the compensation value linked to its associated physical track within the disc drive. During write operations of the disc drive, a volatile memory (such as 152) is accessed to obtain the compensation value for those physical tracks linked to the compensation value.

Process step 214 provides an offset compensation value for each of the physical tracks absent in association with one of the sample tracks through interpolation of a compensation value based on the prior known compensation values. Additionally, process step 214 links the interpolated compensation values determined for each of the physical tracks absent in association with one of the sample tracks to each of the physical tracks absent in association with one of the sample tracks. Following process step 214, the offset compensation optimization process 200 concludes at end process step 216.

Accordingly, the present invention is directed to a method for optimizing reader to writer offset compensation values for use by a disc drive (such as 100). In accordance with one embodiment, steps of associating each logical track of a plurality of logical tracks to a physical track of a plurality of physical tracks is associated, such as step 204; selecting a set of sample tracks from the plurality of physical tracks for use in determining offset compensation values, such as step 206; determining an offset compensation value for each sample track of the set of sample tracks associated with one of the logical tracks by measuring an offset value for each logical track associated with one of the sample tracks, such as step 208; deriving an offset compensation value for each of the sample tracks absent an association with one of the logical tracks, such as step 210; linking each measured offset compensation value and each estimated offset compensation value with its associated physical track, such as process step 212; calculating an offset compensation value for each of the physical tracks absent in association with one of the sample tracks and linking the calculated compensation value determined for each of the physical tracks absent in association with one of the sample tracks to each of the physical tracks absent in association with one of the sample tracks, such as process step 214 are performed to provide optimized compensation values for use by the disc drive in aligning a writer of a read/write head, (such as 118), to a track center of a selected physical track, (such as 160), in preparation for writing data to a logical track, (such as 120), associated with the selected physical track.

A useful technique of deriving the offset compensation value, for each of the sample tracks absent an association with one of the logical tracks, is through the use of an extrapolation technique. One such extrapolation technique includes the steps of determining a first subset of sample tracks comprising the sample tracks absent an association with one of the logical tracks, selecting a second subset of sample tracks substantially equal in number to the first subset of sample tracks, each sample track of the second set of sample tracks associated with one of the logical tracks and wherein the second subset of sample tracks is substantially adjacent the first subset of sample tracks; deriving an algorithm describing a relationship between the offset compensation values for each sample track of the second subset of sample tracks, and applying the algorithm to each sample track of the first subset to extrapolate the offset compensation value for each sample track of the first subset of sample tracks thereby providing the offset compensation value for each of the physical tracks absent an association with one of the logical tracks.

A useful technique of calculating the offset compensation value for use with each of the physical tracks absent an association with one of the sample tracks is through an interpolation of the compensation values for each of the physical track absent an association with one of the sample tracks. One such interpolation technique includes the steps of identifying a logical track and determining the physical track associated with the identified logical track, determining a position of the determined physical track relative to a pair of adjacent sample tracks, selecting an algorithm describing the relationship between the pair of adjacent sample tracks, and applying the algorithm to interpolate an offset compensation value for the physical track associated with the identified logical track.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for improving logical track to physical track offset compensation of a data storage device comprising steps of:
   (a) associating each logical track of a plurality of logical tracks to a physical track of a plurality of physical tracks;
   (b) selecting a set of sample tracks from the plurality of physical tracks for use in determining offset compensation values;
   (c) determining an offset compensation value for use with each sample track of the set of sample tracks associated with one of the logical tracks by measuring an offset value for each logical track associated with one of the sample tracks;
   (d) deriving an offset compensation value for use with each of the sample tracks absent an association with one of the logical tracks; and
   (e) linking each measured offset compensation value and each derived offset compensation value with its associated physical track.

2. The method of claim 1 further comprising steps of;
   (f) calculating an offset compensation value for use with each of the physical tracks absent an association with one of the sample tracks; and
   (g) linking the calculated compensation values to each of the physical tracks absent an association with one of the sample tracks.

3. The method of claim 1 in which the associating step (a) comprises steps of:
   (a1) locating and recording a first of a plurality of physical tracks on a recording surface of the data storage device, each of the plurality of physical tracks having a physical track identification portion written on the recording surface, each physical track identification portion used to identify each of the plurality of physical tracks as a unique physical track;
   (a2) selecting a track density and recording the physical track identification portion with each subsequent physical track of the plurality of physical tracks recorded to the recording surface;
   (a3) allocating and assigning each of the logical tracks to one of the plurality of physical tracks, each of the logical tracks having a logical track identification portion, the logical track identification portion recorded on the recording surface;
   (a4) correlating each of the logical tracks to its assigned physical track by associating the logical track identification portion of each logical track with the physical track identification portion of the physical track assigned to each of the logical track; and (a5) storing a conversion factor used in defining a relationship between each physical track assigned to one of the logical tracks.

4. The method of claim 1 in which the selecting step (b) comprises steps of:
   (b1) determining a plurality of sample tracks distributed across a recording surface of the data storage device, the sample tracks used to measure an offset between a selected one of the logical tracks and the physical track associated with the selected one of the logical tracks, each sample track coincides with one of the physical tracks;
   (b2) identifying each physical track coinciding with one of the plurality of sample tracks to form the set of sample tracks; and
   (b3) associating each sample track of the set of sample tracks with one of the logical tracks.

5. The method of claim 1 in which the determining step (c) comprises steps of:
   (c1) selecting a first sample track from the set of sample tracks and writing a predetermined data pattern on the logical track associated with the selected sample track;
   (c2) servoing a reader element of a read/write head of the data storage unit relative to the first selected sample track to align the reader element with a track center of the first selected sample track;
   (c3) stepping the read/write head to position the reader element a half track off track center of the sample track on a first side of the sample track and measuring an amplitude of the data pattern written to the logical track associated with the selected sample track;
   (c4) moving the read/write head to reposition the read element a half track off track center of the sample track on a second side of the sample track and measuring an amplitude of the data pattern written to the logical track associated with the selected sample track;
   (c5) measuring an amplitude of the data pattern written to the logical track associated with the selected sample track at a plurality of points between the half track off track center of the sample track on the first side of the sample track and the half track off track center of the sample track on the second side of the sample track;
   (c6) analyzing a number of steps and a direction from track center of the selected sample track that a maximum amplitude occurs for the data pattern written to the logical track associated with the selected sample track to determine an offset of the data pattern from the track center of the selected sample track; and
   (c7) determining to the offset compensation value by recording the number of steps of offset from track center that the maximum amplitude of the data pattern occurs and assigning that number of steps a direction opposite the direction of the measured offset.

6. The method of claim 1 in which the deriving step (d) comprises steps of:
   (d1) determining a first subset of sample tracks comprising the sample tracks absent an association with one of the logical tracks;
   (d2) selecting a second subset of sample tracks substantially equal in number to the first subset of sample tracks, each sample track of the second set of sample tracks associated with one of the logical tracks and wherein the second subset of sample tracks is substantially adjacent the first subset of sample tracks;
   (d3) deriving an algorithm describing a relationship between the offset compensation values for each sample track of the second subset of sample tracks; and
   (d4) applying the algorithm to each sample track of the first subset to extrapolate the offset compensation value for each sample track of the first subset of sample tracks thereby providing the offset compensation value for each of the physical tracks absent an association with one of the logical tracks.

7. The method of claim 2 in which the calculating step (f) comprises steps of:
   (f1) identifying a logical track and determining the physical track associated with the identified logical track;
   (f2) determining a position of the determined physical track relative to a pair of adjacent sample tracks;
   (f3) selecting an algorithm describing the relationship between the pair of adjacent sample tracks; and
   (f4) applying the algorithm to interpolate an offset compensation value for the physical track associated with the identified logical track.

8. The method of claim 3 in which the conversion factor of storing step (a5) is an algorithm.

9. The method of claim 3 in which the conversion factor of storing step (a5) is a table.

10. The method of claim 3 in which the conversion factor of storing step (a5) is a value.

11. The method of claim 6 in which the relationship of deriving step (d3) is a linear relationship.

12. The method of claim 6 in which the relationship of deriving step (d3) is a nonlinear relationship.

13. A data storage device comprising:
   a basedeck supporting a spindle motor assembly;
   a recording surface having an outer diameter and an inner diameter attached to the spindle motor assembly, the recording surface for data storage;
   an actuator assembly supported by the basedeck and having a read/write head rotationally positionable adjacent the recording surface, the read/write head comprising a read element for reading data from the recording surface and a write element offset from the read element in one direction across the recording surface from the outer diameter to the inner diameter for writing data to the recording surface;
   a servo system position-controlling the actuator assembly relative to the recording surface;
   a physical track having position information recorded on the recording surface providing the position information to the servo system;
   a logical track offset from the physical track having a data recorded on the recording surface providing the data to the read element; and
   an improved logical track to physical track offset compensation adjusting the read element relative to the logical track provided by steps for improving logical track to physical track offset compensation for the data storage device, comprising steps of:
   (a) associating each logical track of a plurality of logical tracks to a physical track of a plurality of physical tracks;
   (b) selecting a set of sample tracks from the plurality of physical tracks for use in determining offset compensation values;
   (c) determining an offset compensation value for use with each sample track of the set of sample tracks associated with one of the logical tracks by measuring an offset value for each logical track associated with one of the sample tracks;

(d) deriving an offset compensation value for use with each of the sample tracks absent an association with one of the logical tracks;

(e) linking each measured offset compensation value and each derived offset compensation value with its associated physical track; and (f) calculating an offset compensation value for use with each of the physical tracks absent an association with one of the sample tracks and linking the calculated compensation values determined for each of the physical tracks absent an association with one of the sample tracks to each of the physical tracks absent an association with one of the sample tracks.

14. The data storage device of claim 13 in which the associating step (a) comprises steps of:

(a1) locating and recording a first of a plurality of physical tracks on a recording surface of the data storage device, each of the plurality of physical tracks having a physical track identification portion written on the recording surface, each physical track identification portion used to identify each of the plurality of physical tracks as a unique physical track;

(a2) selecting a track density and recording the physical track identification portion with each subsequent physical track of the plurality of physical tracks recorded to the recording surface;

(a3) allocating and assigning each of the logical tracks to one of the plurality of physical tracks, each of the logical tracks having a logical track identification portion, the logical track identification portion recorded on the recording surface;

(a4) correlating each of the logical tracks to its assigned physical track by associating the logical track identification portion of each logical track with the physical track identification portion of the physical track assigned to each of the logical track; and (a5) storing a conversion factor used in defining a relationship between each physical track assigned to one of the logical tracks.

15. The data storage device of claim 13 in which the selecting step (b) comprises steps of:

(b1) determining a plurality of sample tracks distributed across a recording surface of the data storage device, the sample tracks used to measure an offset between a selected one of the logical tracks and the physical track associated with the selected one of the logical tracks, each sample track coincides with one of the physical tracks;

(b2) identifying each physical track coinciding with one of the plurality of sample tracks to form the set of sample tracks; and (b3) associating each sample track of the set of sample tracks with one of the logical tracks.

16. The data storage device of claim 13 in which the determining step (c) comprises steps of:

(c1) selecting a first sample track from the set of sample tracks and writing a predetermined data pattern on the logical track associated with the selected sample track;

(c2) servoing a reader element of a read/write head of the data storage unit relative to the first selected sample track to align the reader element with a track center of the first selected sample track;

(c3) stepping the read/write head to position the reader element a half track off track center of the sample track on a first side of the sample track and measuring an amplitude of the data pattern written to the logical track associated with the selected sample track;

(c4) moving the read/write head to reposition the read element a half track off track center of the sample track on a second side of the sample track and measuring an amplitude of the data pattern written to the logical track associated with the selected sample track;

(c5) measuring an amplitude of the data pattern written to the logical track associated with the selected sample track at a plurality of points between the half track off track center of the sample track on the first side of the sample track and the half track off track center of the sample track on the second side of the sample track; and (c6) determining a number of steps and a direction from track center of the selected sample track that a maximum amplitude occurs for the data pattern written to the logical track associated with the selected sample track.

17. The data storage device of claim 13 in which the deriving step (d) comprises steps of:

(d1) determining a first subset of sample tracks comprising the sample tracks absent an association with one of the logical tracks;

(d2) selecting a second subset of sample tracks substantially equal in number to the first subset of sample tracks, each sample track of the second set of sample tracks associated with one of the logical tracks and wherein the second subset of sample tracks is substantially adjacent the first subset of sample tracks;

(d3) deriving an algorithm describing a relationship between the offset compensation values for each sample track of the second subset of sample tracks; and (d4) applying the algorithm to each sample track of the first subset to extrapolate the offset compensation value for each sample track of the first subset of sample tracks thereby providing the offset compensation value for each of the physical tracks absent an association with one of the logical tracks.

18. The data storage device of claim 13 in which the calculating step (f) comprises steps of:

(f1) identifying a logical track and determining the physical track associated with the identified logical track;

(f2) determining a position of the determined physical track relative to a pair of adjacent sample tracks;

(f3) selecting an algorithm describing the relationship between the pair of adjacent sample tracks; and (f4) applying the algorithm to interpolate an offset compensation value for the physical track associated with the identified logical track.

19. The data storage device of claim 17 in which the relationship of deriving step (d3) is a linear relationship.

20. The data storage device of claim 17 in which the relationship of deriving step (d3) is a nonlinear relationship.

* * * * *